R. L. Myers,
Cotton Basket.

No. 98,091. Patented Dec. 21, 1869.

Witnesses:
C. Raettig
Alex F. Roberts

Inventor:
R. L. Myers
Per Munn & Co
Attorneys.

United States Patent Office.

R. L. MYERS, OF WASHINGTON, NORTH CAROLINA.

Letters Patent No. 98,091, dated December 21, 1869.

IMPROVED COTTON-BASKET.

The Schedule referred to in these Letters Patent and making part of the same.

*To all whom it may concern:*

Be it known that I, R. L. MYERS, of Washington, in the county of Beaufort, and State of North Carolina, have invented a new and useful Improvement in Cotton-Baskets; and I do hereby declare that the following is a full, clear, and exact description thereof, which will enable others skilled in the art to make and use the same, reference being had to the accompanying drawings, forming part of this specification.

This invention relates to improvements in baskets for carrying cotton, especially when ginned; and consists in providing the cotton-baskets, of the ordinary form and construction, with large holes through the centre of the bottom, whereby, in employing the said baskets, the operator may insert his hand and push the cotton out by one effort in a mass, whereas, by the present arrangement, it must be pulled out from the mouth, which takes much more time, as in this way it only comes out in small quantities.

Figure 1:
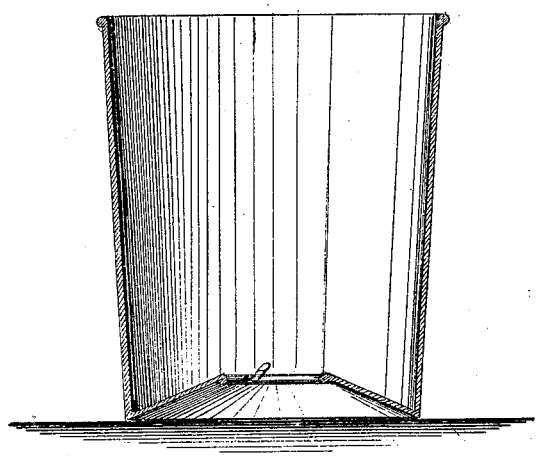

Figure 1 represents a sectional elevation of my improved basket, and

Figure 2:
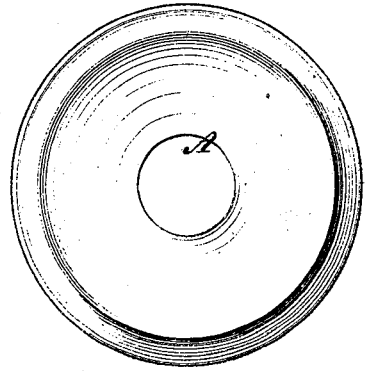

Figure 2, a plan of the bottom of the same.

Similar letters of reference indicate corresponding parts.

I make these baskets, in all respects, similar to the common construction, except that I weave the bottom with a large hole, A, preferably at the centre, whereby, when they are turned with the mouth down, for discharging the cotton which adheres to the inside, the hand may be thrust in to eject the contents *en masse*, the basket being held by the other hand.

Having thus described my invention,

I claim as new, and desire to secure by Letters Patent—

A basket, constructed with a large hole, A, in the bottom, as shown and described.

R. L. MYERS.

Witnesses:
   T. H. B. MYERS,
   W. BRONSON JARVIS.